US010645860B2

(12) United States Patent
Kovach

(10) Patent No.: US 10,645,860 B2
(45) Date of Patent: May 12, 2020

(54) SEEDBED CONDITION MONITORING SYSTEM WITH A SEEDBED SURFACE DETECTION ASSEMBLY

(71) Applicant: CNH Industrial America, LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 15/475,379

(22) Filed: Mar. 31, 2017

(65) Prior Publication Data

US 2018/0279542 A1    Oct. 4, 2018

(51) Int. Cl.
*A01B 76/00* (2006.01)
*A01B 63/28* (2006.01)

(52) U.S. Cl.
CPC .............. *A01B 76/00* (2013.01); *A01B 63/28* (2013.01)

(58) Field of Classification Search
CPC ....... A01B 76/00; A01B 79/005; A01B 49/02; A01B 63/10; A01B 63/111; A01B 63/114; A01B 63/28; A01B 33/087; A01B 29/046
See application file for complete search history.

(56) References Cited

U.S. PATENT DOCUMENTS

| 4,031,963 | A | 6/1977 | Poggemiller et al. |
| 4,176,721 | A | 12/1979 | Poggemiller et al. |
| 4,355,688 | A | 10/1982 | Hamm et al. |
| 4,600,060 | A | 7/1986 | Winter et al. |
| 4,775,940 | A | 10/1988 | Nishida et al. |
| 5,113,957 | A | 5/1992 | Tamai et al. |
| 5,402,740 | A * | 4/1995 | Kinoshita .............. A01C 11/02 111/105 |
| 5,653,292 | A | 8/1997 | Ptacek et al. |
| 5,992,533 | A | 11/1999 | Scarlett et al. |
| 6,164,384 | A | 12/2000 | Manor |
| 6,431,287 | B1 | 8/2002 | Ramp |
| 6,701,857 | B1 | 3/2004 | Jensen et al. |
| 7,980,318 | B1 | 7/2011 | Waldo |
| 8,827,001 | B2 | 9/2014 | Wendte et al. |
| 8,862,339 | B2 | 10/2014 | Henry et al. |
| 8,910,582 | B2 | 12/2014 | Mariam et al. |
| 9,026,321 | B2 | 5/2015 | Henry et al. |
| 9,232,687 | B2 | 1/2016 | Bassett |
| 10,251,328 | B2 * | 4/2019 | Gerber .................. A01B 63/32 |

(Continued)

*Primary Examiner* — Jessica H Lutz
(74) *Attorney, Agent, or Firm* — Rebecca L. Henkel; Rickard K. DeMille

(57) ABSTRACT

In one aspect, a system for monitoring the condition of a seedbed within a field may include an implement having a plurality of ground-engaging tools supported by a frame, with the implement being configured to create or be traversed across a seedbed extending downwardly within the field from an outer seedbed surface to a seedbed floor. The system may also include an auxiliary support arm coupled to a portion of the frame at or adjacent to the aft end of the frame and a seedbed surface detection assembly coupled to the auxiliary support arm such that the seedbed surface detection assembly is located behind the ground-engaging tools relative to a forward travel direction of the implement. The seedbed surface detection assembly may be configured to detect variations in a profile of the outer seedbed surface as the implement is moved in the forward travel direction.

12 Claims, 10 Drawing Sheets

(56) References Cited

U.S. PATENT DOCUMENTS

| | | | |
|---|---|---|---|
| 2007/0272134 A1* | 11/2007 | Baker | A01B 63/111 |
| | | | 111/163 |
| 2010/0319941 A1 | 12/2010 | Peterson | |
| 2012/0048160 A1* | 3/2012 | Adams | A01C 7/203 |
| | | | 111/163 |
| 2015/0230391 A1 | 8/2015 | Houck | |
| 2016/0029547 A1 | 2/2016 | Casper et al. | |
| 2016/0262300 A1* | 9/2016 | Gates | A01B 63/245 |
| 2017/0079189 A1* | 3/2017 | Steinlage | A01B 61/044 |
| 2017/0079190 A1* | 3/2017 | Steinlage | A01B 61/046 |
| 2017/0079197 A1* | 3/2017 | Steinlage | A01B 73/044 |
| 2018/0077848 A1* | 3/2018 | Knobloch | A01B 49/027 |
| 2018/0124991 A1* | 5/2018 | Knobloch | A01B 63/008 |
| 2018/0139884 A1* | 5/2018 | Karstens | A01B 29/06 |
| 2018/0139891 A1* | 5/2018 | Gerber | A01B 63/32 |
| 2018/0139892 A1* | 5/2018 | Knobloch | A01B 19/04 |
| 2018/0160613 A1* | 6/2018 | Kovach | A01B 63/28 |
| 2018/0206387 A1* | 7/2018 | Stark | A01B 63/111 |

* cited by examiner

SEEDBED CONDITION MONITORING SYSTEM WITH A SEEDBED SURFACE DETECTION ASSEMBLY

FIELD OF THE INVENTION

The present subject matter is generally directed to a seedbed condition monitoring system when performing field operations (e.g., tillage operations) and, more particularly, to a system for detecting variations in a profile(s) of the outer seedbed surface created or traversed across by an agricultural implement during the performance of a field operation.

BACKGROUND OF THE INVENTION

It is well known that to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is desirable to create a level and uniform layer of tilled soil across the field to form a proper seedbed for subsequent planting operations. However, due to varying soil conditions across the field and/or other factors, the levelness and/or uniformity of the seedbed may be impacted significantly. Such poor seedbed conditions can result in a subsequent loss in the crop yield, such as due to poor germination and/or non-uniform plant stands. In this regard, attempts have been made to develop systems to monitor the condition of the seedbed created during a tillage operation. However, to date, such systems have failed to provide an effective and simple solution for monitoring seedbed conditions.

Accordingly, an improved system for monitoring seedbed conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring the condition of a seedbed within a field. The system may include an implement having a frame extending between a forward end and an aft end. The implement may further include a plurality of ground-engaging tools supported by the frame, with the implement being configured to create or be traversed across a seedbed extending downwardly within the field from an outer seedbed surface to a seedbed floor. The system may also include an auxiliary support arm extending lengthwise between a proximal end and a distal end. The proximal end may be rigidly coupled to a portion of the frame at or adjacent to the aft end of the frame such that the auxiliary support arm is non-pivotally coupled to the frame. Additionally, the system may include a seedbed surface detection assembly coupled to the auxiliary support arm such that the seedbed surface detection assembly is located behind the ground-engaging tools relative to a forward travel direction of the implement. The seedbed surface detection assembly may include a pivot arm pivotally coupled to the auxiliary support arm and a surface-engaging member coupled to the pivot arm. The surface-engaging member may be configured to contact the outer seedbed surface as the implement is moved across the field in the forward travel direction. Moreover, the system may also include a sensor configured to detect pivotal motion of the pivot arm relative to the support arm, with the pivotal motion of the pivot arm being indicative of variations in a profile of the outer seedbed surface as the surface-engaging member contacts the outer seedbed surface with movement of the implement in the forward travel direction.

In another aspect, the present subject matter is directed to a system for monitoring the condition of a seedbed within a field. The system may include an implement having a frame extending between a forward end and an aft end. The implement may also include a plurality of ground-engaging tools supported by the frame, with the implement being configured to create or be traversed across a seedbed extending downwardly within the field from an outer seedbed surface to a seedbed floor. The system may also include an auxiliary support arm extending lengthwise between a proximal end and a distal end, with the proximal end being rigidly coupled to a portion of the frame at or adjacent to the aft end of the frame such that the auxiliary support arm is non-pivotally coupled to the frame. In addition, the system may include a seedbed surface detection assembly coupled to the auxiliary support arm such that the seedbed surface detection assembly is located behind the ground-engaging tools relative to a forward travel direction of the implement. The seedbed surface detection assembly may include a pivot arm pivotally coupled to the auxiliary support arm and a surface-engaging member coupled to the pivot arm. The surface-engaging member may be configured to contact the outer seedbed surface as the implement is moved across the field in the forward travel direction. The seedbed surface detection assembly may also include a seedbed surface sensor configured to detect pivotal motion of the pivot arm relative to the support arm. Moreover, the system may include a controller communicatively coupled to the seedbed surface sensor. The controller may be configured to detect variations in a profile of the outer seedbed surface as the surface-engaging member contacts the outer seedbed surface with movement of the implement in the forward travel direction based on sensor measurements provided by the seedbed surface sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
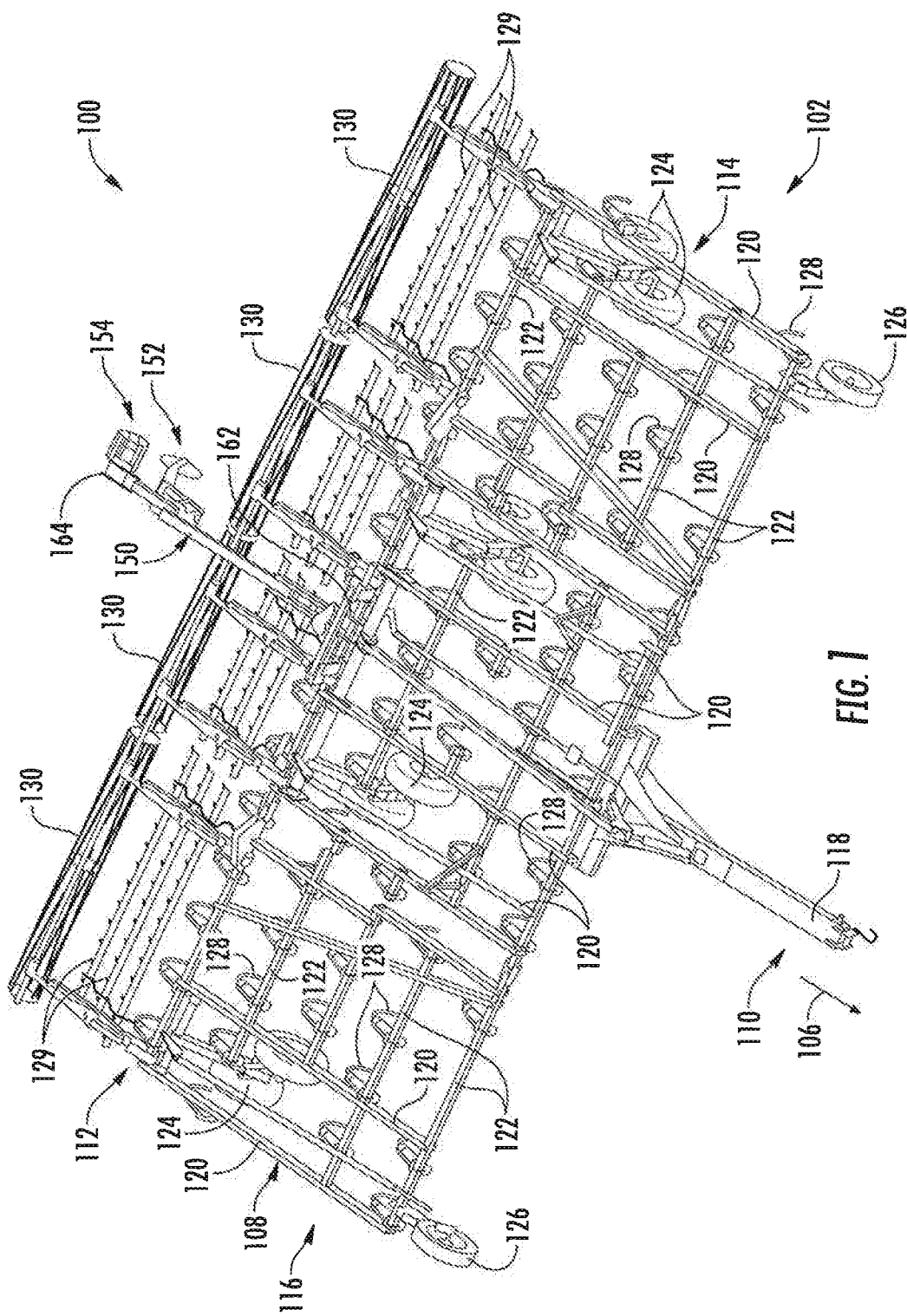
FIG. 1 illustrates a perspective view of one embodiment of a system for monitoring the condition of a seedbed when performing a field operation in accordance with aspects of the present subject matter, particularly illustrating the system including a tillage implement and seedbed floor and surface detection assemblies coupled to the tillage implement via an auxiliary support arm.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring the condition of a seedbed created during the performance of a field operation, such as a tillage operation. Specifically, in several embodiments, a seedbed floor detection assembly and/or a seedbed surface detection assembly may be coupled to an agricultural implement at its aft end such that the assembly(ies) can be utilized to monitor the condition(s) of the seedbed directly behind the implement. For instance, the seedbed floor detection assembly may be configured to detect variations in a vertical profile of the seedbed floor as the implement is moved across the field. Similarly, the seedbed surface detection assembly may be configured to detect variations in a vertical profile of the outer seedbed surface as the implement is moved across the field. Based on such detected profile variations, a controller of the system may be configured to execute a control action (e.g., by adjusting the operation of the tillage implement) to account for the profile variations, thereby allowing a more uniform and level seedbed to be created as the field operation is being performed.

The present subject matter will generally be described herein in the context of monitoring seedbed conditions when performing a tillage operation using a tillage implement, such as a cultivator. However, it should be appreciated that the disclosed system and method may also be used to monitor seedbed conditions within a field when performing any other suitable type of field operation, such as fertilizing, planting, and/or the like. Additionally, it should be appreciated that the disclosed system components may be provided in operative association with any suitable agricultural implement configured to perform a field operation, such as cultivators, disk harrows, planters, fertilizers, chisels, and/or the like.

Figure 2:
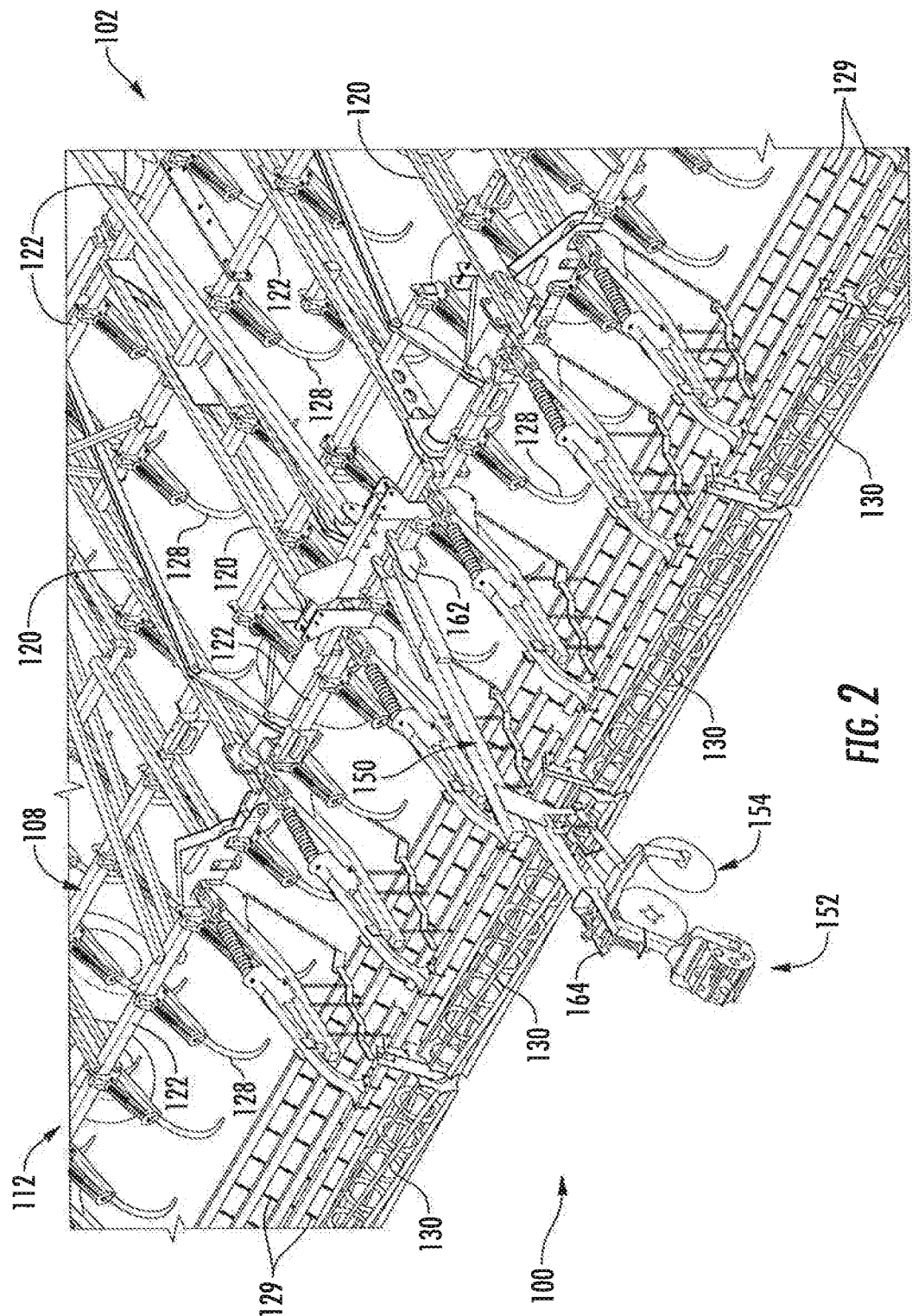
FIG. 2 illustrates a partial perspective view of the system shown in FIG. 1, particularly illustrating an aft portion of the tillage implement as well as the seedbed floor and surface detection assemblies being coupled to a frame of the tillage implement at or adjacent to its aft end.

Referring now to the drawings, FIGS. 1 and 2 illustrate differing perspective views of one embodiment of a system 100 for monitoring one or more conditions of a seedbed when performing a field operation in accordance with aspects of the present subject matter. Specifically, FIG. 1 illustrates a perspective view of a tillage implement 102 of the system 100 as well as various other components of the disclosed system 100 installed at or adjacent to an aft end of the implement 102. Additionally, FIG. 2, illustrates a partial, perspective view of an aft or rear portion of the tillage implement 102 shown in FIG. 1, particularly illustrating a more detailed view of the various system components installed at or adjacent to the aft end of the implement 102.

In general, the system 100 may include an implement 102 configured to be towed or pulled behind a work vehicle (not shown in FIGS. 1 and 2), such as an agricultural tractor, in a forward direction of travel (e.g., as indicated by arrow 106 in FIG. 1). As shown, the tillage implement 102 may include a main implement frame 108 extending lengthwise between a forward end 110 and an aft end 112 and cross-wise between a first side 114 and a second side 116. In one embodiment, the implement frame 108 may include a hitch 118 or other suitable coupling located at its forward end 110 that is configured to couple the tillage implement 102 to the associated work vehicle. Additionally, as shown in FIG. 1, the implement frame 108 may include a plurality of frame members 120, 122, such as a plurality of lengthwise frame members 120 extending longitudinally between the forward and aft ends 110, 112 of the frame 108 and a plurality of cross-wise frame members 122 extending longitudinally between the first and second sides 14, 116 of the frame 108. Moreover, the implement 102 may also include a plurality of wheels coupled to the implement frame 108, such as a set of centrally located wheels 124 and a set of from pivoting wheels 126.

Referring still to FIGS. 1 and 2, the tillage implement 102 may also include a plurality of ground-engaging tools 128, 129, 130 supported by the implement frame 108. For instance, as shown in the illustrated embodiment, the implement 102 may include a plurality of rows of shanks 128 coupled to a forward portion of the frame 108. In addition, the implement 102 may include a plurality tines 129 supported by the frame 108 at a location aft of the shanks 128. Moreover, as shown in FIGS. 1 and 2, the tillage implement 102 may also include one or more rolling baskets 130 coupled to the implement frame 108 at or adjacent to its aft end 112.

It should be appreciated that, in addition to the shanks 128, tines 129, and baskets 130 shown in FIGS. 1 and 2 (or as an alternative thereto), the implement 102 may include any other suitable ground-engaging tools. For instance, if the implement 102 is configured as a disk harrow, the implement 102 may include a plurality of rows of disc blades, such as a plurality of fluted-concave disc blades. Similarly, if the implement 102 is configured as a planter, the implement 102 may include a plurality of opener discs, closer discs, pack wheels and/or the like.

In addition, the system 100 may also include various components provided in operative association with the tillage implement 102 for monitoring the condition of the seedbed being created by the implement 102 when performing an operation within the field. Specifically, in several embodiments, the system components may be configured to be installed onto the tillage implement 102 such that the condition of the seedbed may be monitored immediately behind the aft-most ground-engaging tools of the implement 102 (e.g., the row of rolling baskets 130 in the illustrated embodiment). As such, the disclosed system 100 may allow for the quality of the seedbed to be assessed in real time as the tillage implement 102 is being pulled across the field.

As particularly shown in FIG. 2, the system 100 may include an auxiliary support arm 150 configured to be coupled to a portion of the implement frame 108 at or adjacent to its aft end 112, such as by coupling the auxiliary support arm 150 to one of the cross-wise frame members 122 configured to support one or more of the rolling baskets 130 adjacent to the aft end 112 of the frame 108. Additionally, as shown in the illustrated embodiment, the system 100 may also include a seedbed floor detection assembly 152 and a seedbed surface detection assembly 154 coupled to the auxiliary support arm 150. In general, the seedbed floor and surface detection assemblies 152, 154 may be configured to monitor the condition of the seedbed created by the ground-engaging tools 128, 130 of the implement 102 as the field operation is being performed. For instance, as will be described below, the seedbed floor detection assembly 152 may be configured to detect variations in a vertical profile of the floor of the seedbed (i.e., the upper surface of the firm layer of unfilled soil positioned directly below the seedbed). Similarly, the seedbed surface detection assembly 154 may be configured to sense variations in a vertical profile of the upper or outer surface of the seedbed created by the tillage implement 102. By sensing variations in the profile(s) of the floor and/or the outer surface of the seedbed, the system 100 may allow for the quality of the seedbed to be assessed, such as by assessing the levelness and/or uniformity of the seedbed. Moreover, as will be described below, in the event that it is determined that the seedbed quality is not as desired (e.g., due to the variation in one or both of the seedbed profile(s) exceeding a give variation threshold), a controller of the system 100 may be configured to execute a control action to address the detected profile variations, such as by adjusting the operation of the tillage implement 102 and/or by transmitting a notification to the operator of the associated work vehicle.

Figure 3:
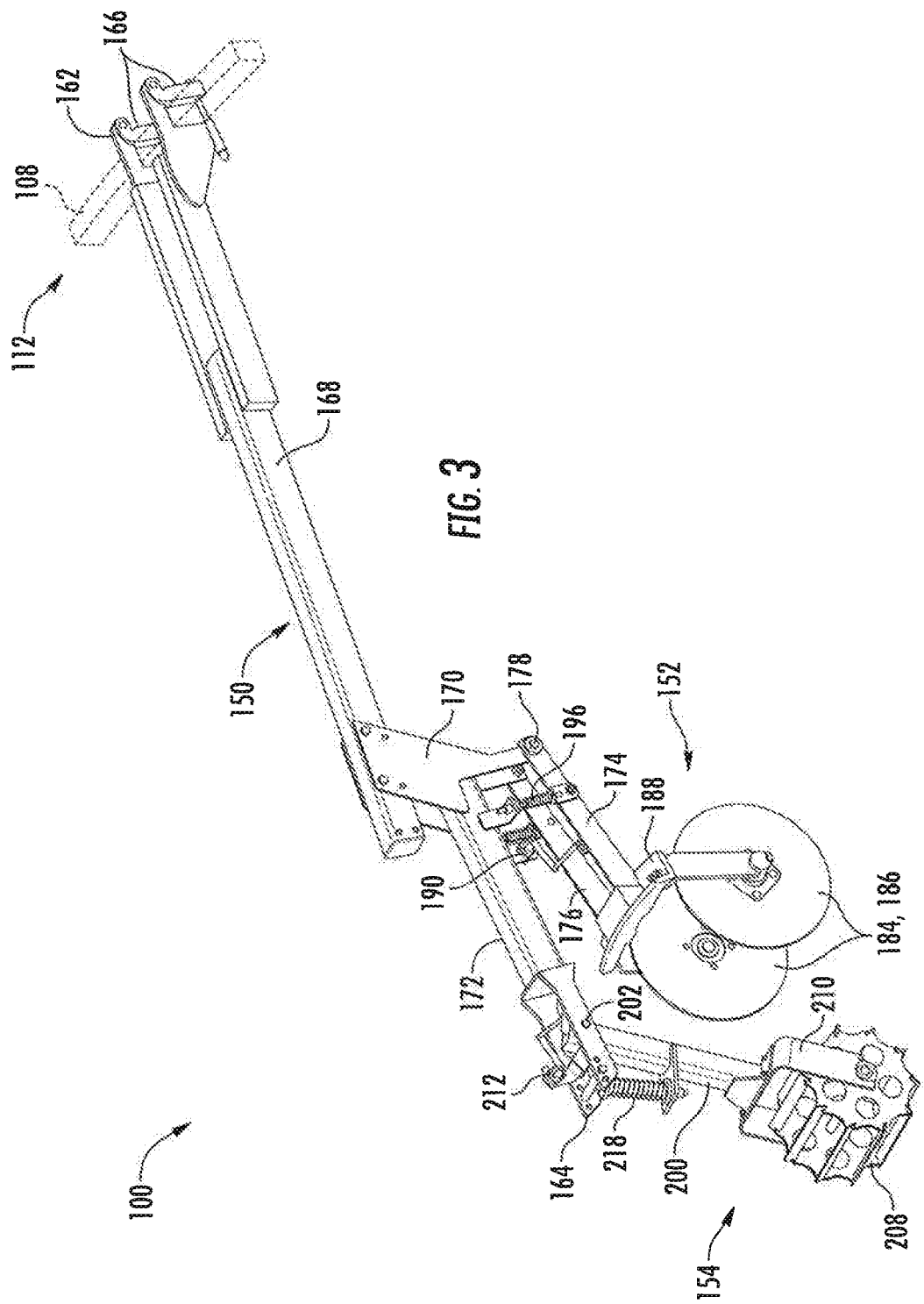
FIG. 3 illustrates a perspective view of one embodiment of the auxiliary support arm, the seedbed floor detection assembly, and the seedbed surface detection assembly shown in FIGS. 1 and 2.
Figure 4:
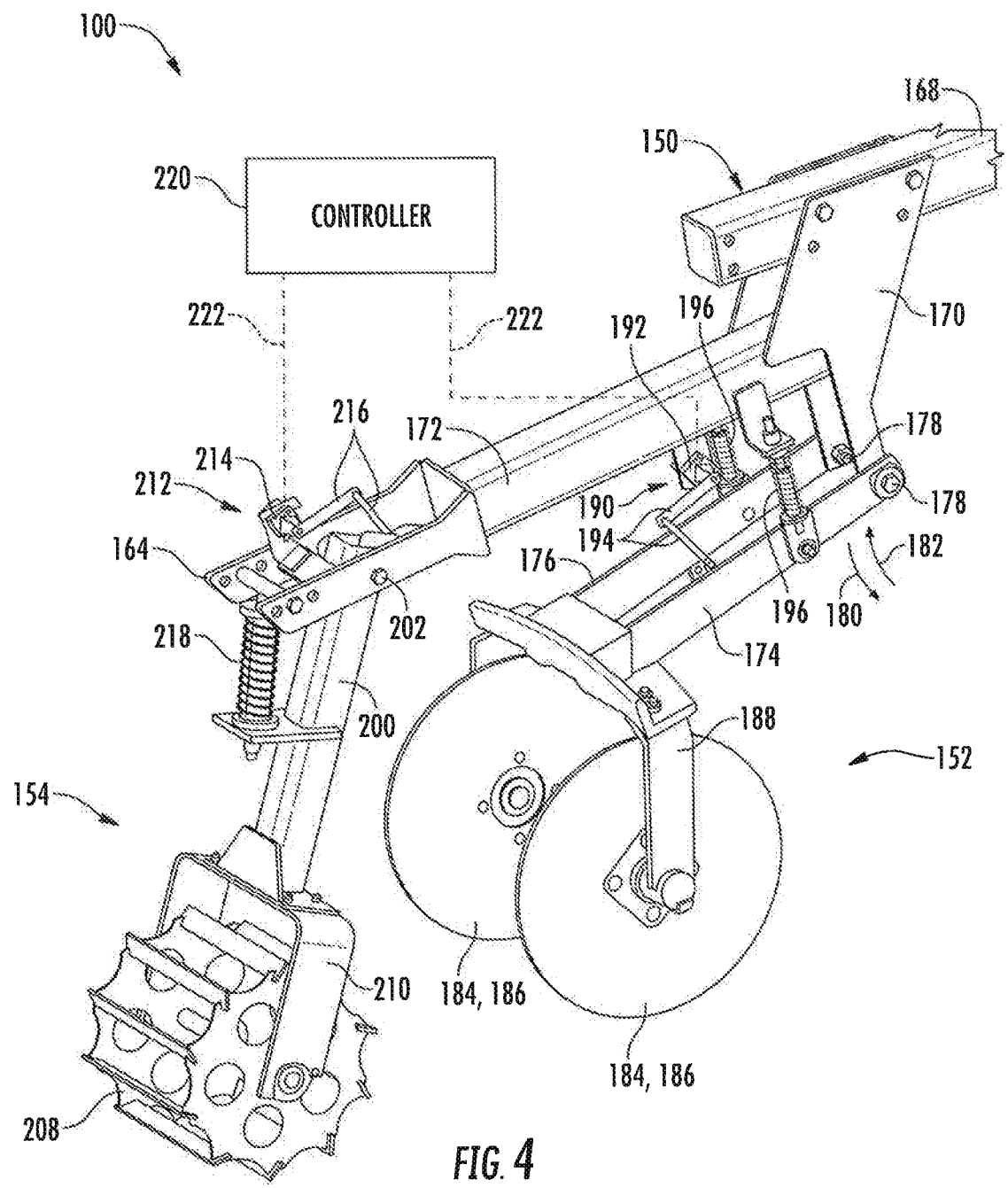
FIG. 4 illustrates a partial perspective view of the system components shown in FIG. 3, particularly illustrating the seedbed floor detection assembly and the seedbed surface detection assembly coupled to a distal portion of the support arm.
Figure 5:
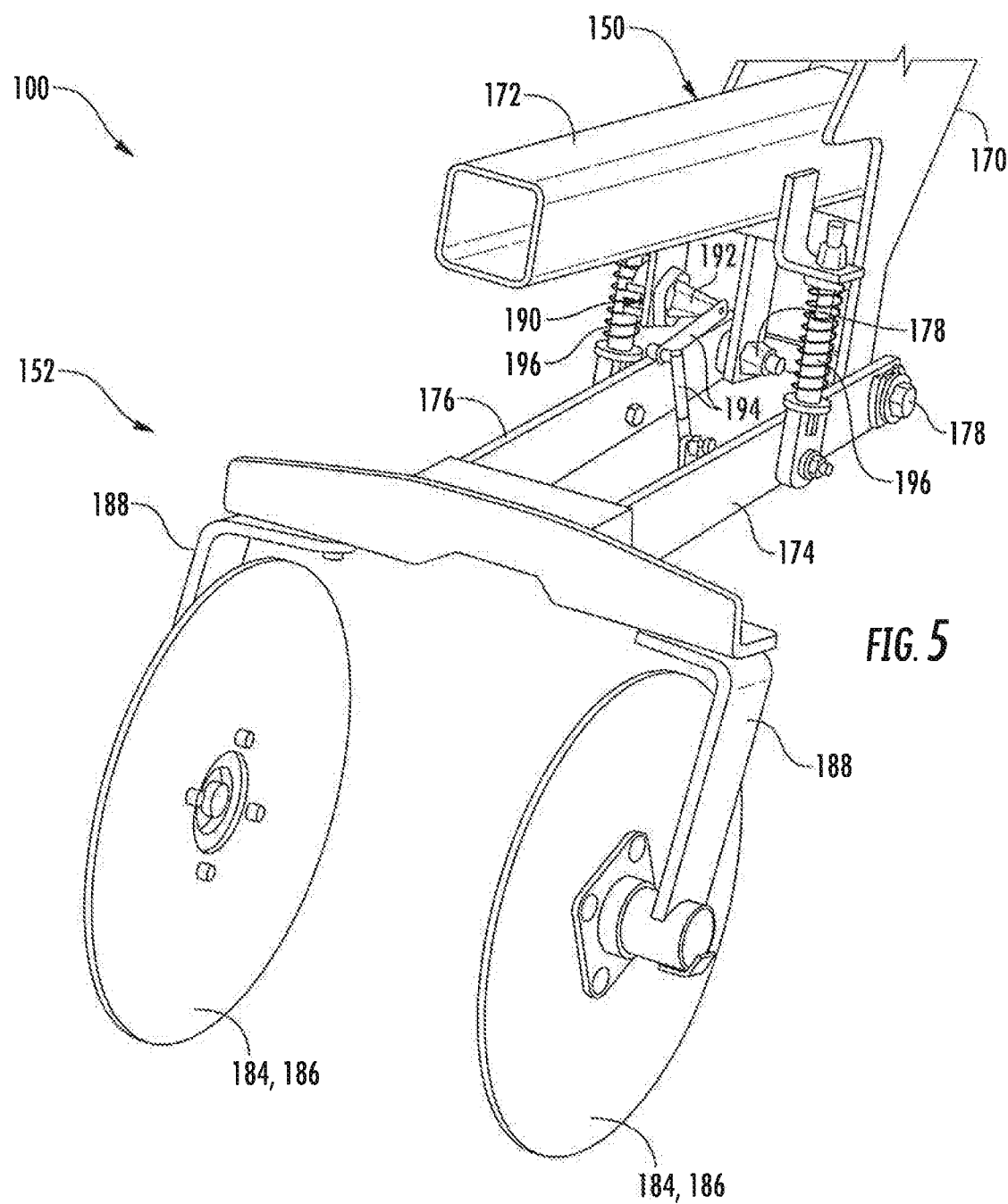
FIG. 5 illustrates a perspective view of the seedbed floor detection assembly shown in FIGS. 3 and 4 with the seedbed surface detection assembly removed for purposes of illustration.
Figure 6:
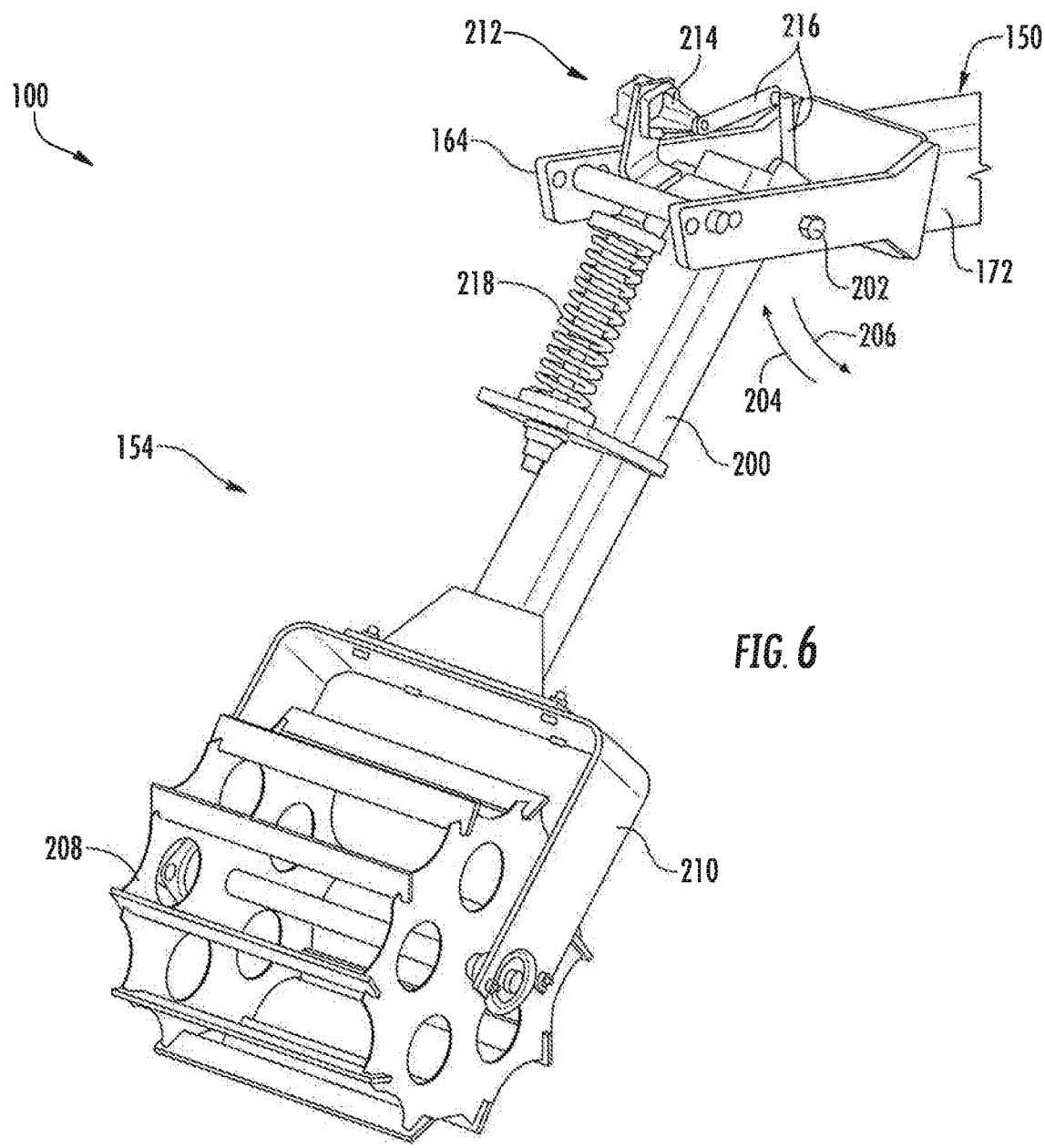
FIG. 6 illustrates a perspective view of the seedbed surface detection assembly shown in FIGS. 3 and 4 with the seedbed floor detection assembly removed for purposes of illustration.
Figure 7:
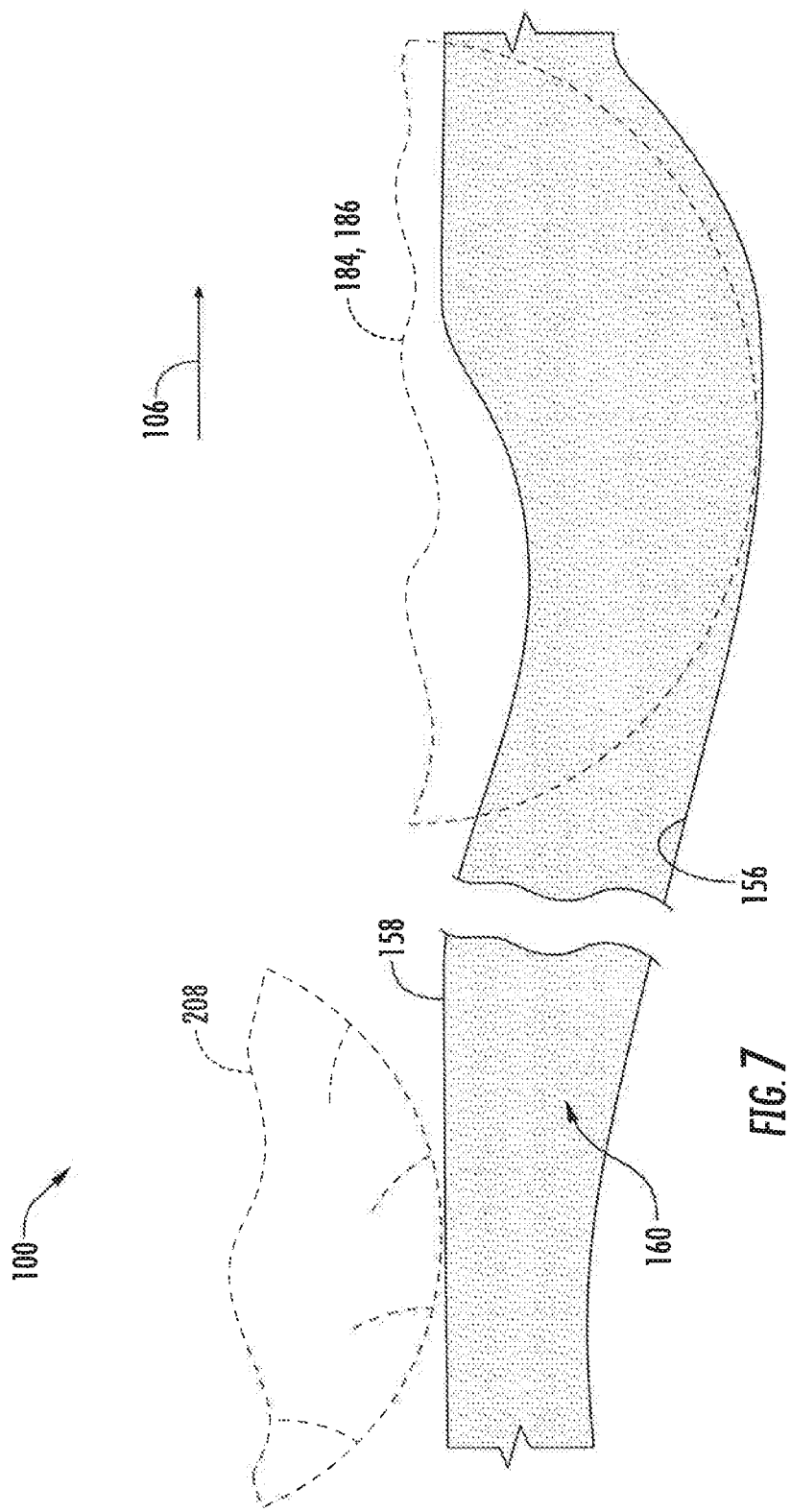
FIG. 7 illustrates a simplified view of ground-engaging portions of the seedbed floor detection assembly and the seedbed surface detection assembly positioned relative to a floor and an outer surface, respectively, of a seedbed directly behind a tillage implement following the performance of a field operation.

Referring now to FIGS. 3-7, various views of one embodiment of the auxiliary support arm 150, the seedbed floor detection assembly 152, and the seedbed surface detection assembly 154 of the system 100 described above with reference to FIGS. 1 and 2 are illustrated in accordance with aspects of the present subject matter. Specifically, FIG. 3 illustrates a perspective view of the auxiliary support arm 150, the seedbed floor detection assembly 152, and the seedbed surface detection assembly 154. FIG. 4 illustrates a perspective view of an aft portion of the auxiliary support arm 150, particularly illustrating the seedbed floor detection assembly 152 and the seedbed surface detection assembly 154 coupled to and supported by the aft portion of the support arm 150. Additionally, FIG. 5 illustrates a perspective view of the seedbed floor detection assembly 152 shown in FIGS. 3 and 4 with the seedbed surface detection assembly 154 removed for purposes of illustration while FIG. 6 illustrates a perspective view of the seedbed surface detection assembly 154 shown in FIGS. 3 and 4 with the seedbed floor detection assembly 152 removed for purposes of illustration. Moreover, FIG. 7 illustrates a simplified view of ground-engaging portions of the seedbed floor detection assembly 152 and the seedbed surface detection assembly 154 positioned relative to a floor 154 and an outer surface 156, respectively, of a seedbed 160 directly behind the tillage implement 102 following the performance of a tillage operation.

As particularly shown in FIG. 3, the auxiliary support arm 150 may generally be configured to extend lengthwise between a proximal end 162 and a distal end 164. In general, the proximal end 162 of the support arm 150 may be configured to be coupled to a portion of the implement frame 108 at or adjacent to its aft end 112. Specifically, as shown in FIG. 3, a clamp mount 166 or any other suitable mounting structure may be provided at the proximal end 162 of the support arm 150 for coupling the support arm 150 to one of the frame members 120, 122 of the implement frame 108 disposed at or adjacent to the frame's aft end 112. For instance, as shown in the embodiment of FIG. 2, the proximal end 162 of the support arm 150 is coupled to one of the cross-wise frame members 122 configured to support one or more of the rolling baskets 130 adjacent to the aft end 112 of the frame 108. However, in other embodiments, the proximal end 162 of the support arm 150 may be coupled to any other suitable frame member 120, 122 or portion of the frame 108 disposed at or adjacent to its aft end 112. Additionally, as shown in FIG. 3, the auxiliary support arm 150 may be configured to extend outwardly from the implement frame 108 such that the distal end 164 of the auxiliary support arm 150 is spaced apart from the aft end 112 of the frame 108 in the direction opposite the forward travel direction 106 of the implement 102. For instance, as shown in the embodiment of FIGS. 1 and 2, the auxiliary support frame 150 may extend from the aft end 112 of the implement frame 108 such that the seedbed floor detection assembly 152 and the seedbed surface detection assembly 154 are supported behind the row of rolling baskets 130 of the tillage implement 102.

It should be appreciated that, in several embodiments, the proximal end 162 of the auxiliary support arm 150 may be rigidly or non-pivotally coupled to the frame 108 such that the positioning or orientation of the support arm 150 relative to the implement frame 108 remains substantially fixed or constant. As such, in accordance with aspects of the present subject matter, the support arm 150 may be used as a reference for monitoring any variations in the profile(s) of the floor 156 (FIG. 7) and/or the outer surface. 158 (FIG. 7) of the seedbed 160.

Moreover, in several embodiments, the auxiliary support arm 150 may include two or more arm segments extending between its proximal and distal ends 162, 164. For instance, as shown in FIG. 3, the auxiliary support arm 150 includes a first arm segment 168 extending from its proximal end 162 to a mounting bracket 170 and a second arm segment 172 extending outwardly from the mounting bracket 170 to the distal end 164 of the support arm 150, with the first and second arm segments 168, 172 being rigidly coupled to one another via the mounting bracket 170. However, in other embodiments, the auxiliary support arm 150 may be configured as a single continuous arm member extending between the proximal and distal ends 162, 164 of the support arm 150 or the support arm 150 may include three or more arm segments rigidly coupled to one another between its proximal and distal ends 162, 164.

Additionally, as shown in FIGS. 3-5, the seedbed floor detection assembly 152 may be configured to be supported by a portion of the auxiliary support arm 150 between its proximal and distal ends 162, 164, such as by coupling the floor detection assembly 152 to a portion of the mounting bracket 170 of the support arm 150. In several embodiments, the seedbed floor detection assembly 152 may include one or more pivot arms (e.g., a first pivot arm 174 and a second pivot arm 176) pivotally coupled to the support arm 150 such that the pivot arms 174, 176 are configured to pivot relative to the support arm 150. For instance, as particularly shown in FIGS. 4 and 5, the pivot arms 174, 176 may be pivotally coupled to the support arm 150 at pivot points 178 defined between the pivot arms 174, 176 and the mounting bracket 170. As such, the pivot arms 174, 176 may pivot relative to the support arm 150 about the pivot points 178 (e.g., as indicated by arrows 180, 182 in FIG. 4).

In addition, the seedbed floor detection assembly 152 may include one or more seedbed tools 184 coupled to the pivot arms 174, 176. In general, the seedbed tool(s) 184 may be configured to ride along or otherwise contact the floor 156 of the seedbed 160 created by the tillage implement 102 as the implement 102 is being moved through the field, thereby allowing the seedbed tool(s) 184 to follow the contour or profile of the seedbed floor 156. For instance, as shown in FIG. 7, the seedbed tool(s) 184 may ride along the seedbed floor 156 as the tillage implement 102 (and, thus, the seedbed floor detection assembly 152) is moved in the forward travel direction 106. Thus, as the seedbed tool(s) 184 is moved across a portion of the seedbed floor 156 that includes vertically-oriented variations in its profile (e.g., dips or raises in the seedbed floor 156), the seedbed tool(s) 184 may raise or lower relative to the auxiliary support arm 150 as the tool(s) 184 follows the profile of the seedbed floor 156. Such raising or lowering of the seedbed tool(s) 184 may, in turn, result in the pivot arms 174, 176 pivoting relative to the support arm 150. For instance, as the seedbed tool(s) 184 rises with increases in the vertical profile of the seedbed floor 156, the pivot arms 174, 176 may pivot upwardly about the pivot points 178 in a first direction (e.g., as indicated by arrow 180 in FIG. 4). Similarly, as the seedbed tool(s) 184 lowers with reductions in the vertical profile of the seedbed floor 156, the pivot arms 174, 176 may pivot downwardly about the pivot points 178 in an opposite, second direction (e.g., as indicated by arrow 182 in FIG. 4).

In general, the seedbed tool(s) 184 may correspond to any suitable tool(s) and/or member(s) that is configured to penetrate through the loosened soil layer forming the seedbed 160 and ride along or otherwise contact the seedbed floor 156 as the tillage implement 102 is being moved across the field. In several embodiments, the seedbed tools) 184 may correspond to one or more rotary members configured to rotate or roll along the seedbed floor 156. For instance, as shown in the illustrated embodiment, the seedbed tool(s) 184 may correspond to a pair of rotary discs 186 (e.g., dulled coulter discs) configured to penetrate through the loosened soil of the seedbed 160 and roll along the seedbed floor 156. In such an embodiment, the rotary discs 186 may be coupled to the pivot arms 174, 176 via a suitable support bracket 188 or other suitable mounting means to allow the rotary discs 186 to be rotationally supported relative to the seedbed floor 156. In other embodiments, the seedbed tool(s) 184 may correspond to one or more non-rotary tools, such as a sweep or a tine, configured to penetrate through the loosened soil of the seedbed 160 and contact the seedbed floor 156 as the tillage implement 102 is being moved across the field.

Additionally, the seedbed floor detection assembly 152 may also include one or more seedbed floor sensors 190 configured to detect pivotal motion of the pivot arms 174, 176 relative to the support arm 150. By detecting the pivotal motion of the pivot arms 174, 176 relative to the support arm 150, the sensor(s) 190 may be configured to indirectly detect variations in the vertical profile of the seedbed floor 156 as the pivot arms 174, 176 pivot due to changes in the vertical positioning of the seedbed tool(s) 184 as such tool(s) 184 ride along the seedbed floor 156. Accordingly, the pivotal motion of the pivot arms 174, 176 may be used to track variations in the vertical profile of the seedbed floor 156.

It should be appreciated that the seedbed floor sensor(s) 190 may generally correspond to any suitable sensor(s) or sensing device(s) that is configured to directly or indirectly detect the pivotal motion of the pivot arms 174, 176. In several embodiments, the seedbed floor sensor(s)) 190 may include a rotary sensor 192 (e.g., a rotary potentiometer or a magnetic rotary sensor) coupled to the support arm 150 or one of the pivot arms 174, 176 and an associated sensor linkage 194 coupled between the rotary sensor 192 and the other adjacent component. For instance, as shown in the illustrated embodiment, the rotary sensor 192 is coupled to a portion of the support arm 150, with the sensor linkage 194 being coupled between the rotary sensor 192 and one of the pivot arms 174, 176. As such, when the pivot arms 174, 176 pivot relative to the support arm 150, the motion of the pivot arms 174, 176 may be detected by the rotary sensor 192 via the mechanical linkage provided by the sensor linkage 194.

In other embodiments, the seedbed floor sensor(s) 190 may correspond to any other suitable sensor(s) or sensing device(s) configured to detect the pivotal motion of the pivot arms 174, 176. For instance, the seedbed floor sensor(s) 190 may correspond to a linear potentiometer, a proximity sensor, and/or any other suitable transducer (e.g., ultrasonic, electromagnetic, infrared, etc.) that allows the pivotal motion of the pivot arms 174, 176 to be directly or indirectly detected.

As shown in FIGS. 4 and 5, the seedbed floor detection assembly 152 may also include one or more biasing mechanisms 196 configured to bias the seedbed tool(s) 184 in the direction of the seedbed floor 156. For instance, as shown in the illustrated embodiment, the biasing mechanisms 196 correspond to first and second spring-loaded devices coupled between support arm 150 and the first and second pivot arms 174, 176, respectively. As such, the spring-loaded devices may bias the pivot arms 174, 176 away from the support arm 150, thereby forcing the seedbed tool(s) 184 downwardly in the direction of the seedbed floor 156. However, in other embodiments, the biasing mechanism(s) 196 may correspond to any other suitable device(s), such as a fluid-driven cylinder or any other suitable linear actuator.

As shown in FIGS. 3, 4 and 6, the seedbed surface detection assembly 154 may be configured to be supported by a portion of the auxiliary support arm 150 between its proximal and distal ends 162, 164 at a location aft of the seedbed floor detection assembly 152, such as by coupling the surface detection assembly 154 to the support arm 150 adjacent to its distal end 164. In several embodiments, the seedbed surface detection assembly 154 may include one or more pivot arms 200 pivotally coupled to the support arm 150 such that the pivot arm(s) 200 is configured to pivot relative to the support arm 150. For instance, as particularly shown in FIGS. 4 and 6, the pivot arm 200 may be pivotally coupled to the support arm 150 at a pivot point 202 defined between the pivot arm 200 and the support arm 150. As such, the pivot arm 200 may pivot relative to the support arm 150 about the pivot point 202 (e.g., as indicated by arrows 204, 206 in FIG. 6).

In addition, the seedbed surface detection assembly 154 may include one or more surface-engaging members 208 coupled to the pivot arm 200. In general, the surface-engaging member(s) 208 may be configured to ride along or otherwise contact the outer surface 158 of the seedbed 160 created by the tillage implement 102 as the implement 102 is being moved through the field, thereby allowing the surface-engaging member(s) 208 to follow the contour or profile of such outer seedbed surface 158. For instance, as shown in FIG. 7, the surface-engaging member(s) 208 may correspond to a rotary member(s) configured to roll along the outer surface 158 of the seedbed 160 as the tillage implement 102 (and, thus, the seedbed surface detection assembly 154) is moved in the forward travel direction 106. Thus, as the surface-engaging member(s) 208 rolls across a portion of the outer seedbed surface 158 that includes vertically-oriented variations in its profile (e.g., dips or raises in the outer surface 158), the surface-engaging member(s) 208 may raise or lower relative to the auxiliary support arm 150 as the member(s) 208 follows the profile of the outer seedbed surface 158. Such raising or lowering of the surface-engaging member(s) 208 may, in turn, result in the pivot arm 200 pivoting relative to the support arm 150. For instance, as the surface-engaging member(s) 208 rises with increases in the vertical profile of the outer seedbed surface 158, the pivot arm 200 may pivot upwardly about the pivot point 202 in a first direction (e.g., as indicated by arrow 204 in FIG. 6). Similarly, as the surface-engaging member(s) 208 lowers with reductions in the vertical profile of the outer seedbed surface 158, the pivot arm 200 may pivot downwardly about the pivot point 202 in an opposite, second direction (e.g., as indicated by arrow 206 in FIG. 6).

In general, the surface-engaging member(s) 208 may correspond to any suitable tool and/or member that is configured to ride along or otherwise contact the outer seedbed surface 158 as the tillage implement 102 is being moved across the field. As indicated above, the surface-engaging member(s) 208 may, in several embodiments, correspond to one or more rotary members, such as one or more rolling baskets. For instance, as shown in the illustrated embodiment, the surface-engaging member(s) 208 corresponds to a crumbler basket, such as a bar-based or tube-based crumbler basket, configured to roll along the outer seedbed surface 158. In such an embodiment, the rolling basket may be coupled to the pivot arm 200 via a suitable support bracket 210 or other suitable mounting means to allow the basket to be rotationally supported relative to the outer seedbed surface 158. In other embodiments, the surface-engaging member(s) 208 may correspond to any other suitable rotary tool(s) and/or member(s) configured to roll along the outer seedbed surface 158, such as a wheel or tire. Alternatively, the surface-engaging members) 208 may correspond to any suitable non-rotary tool(s) and/or member(s) that is configured to ride along or otherwise contact the outer seedbed surface 158, such as tine, fingers, and/or the like.

Additionally, the seedbed surface detection assembly 154 may also include one or more seedbed surface sensors 212 configured to directly or indirectly detect pivotal motion of the pivot arm 200 relative to the support arm 150. By detecting the pivotal motion of the pivot arm 200 relative to the support arm 150, the sensor(s) 212 may be configured to indirectly detect variations in the vertical profile of the outer seedbed surface 158 as the pivot arm 200 pivots due to changes in the vertical positioning of the that is configured to ride along or otherwise contact the outer seedbed surface-engaging member(s) 208 as such member(s) 208 rolls along the outer seedbed surface 158. Accordingly, the pivotal motion of the pivot arm 200 may be used to track variations in the vertical profile of the outer seedbed surface 158.

It should be appreciated that the seedbed surface sensor(s) 212 may generally correspond to any suitable sensor(s) or sensing device(s) that is configured to directly or indirectly detect the pivotal motion of the pivot arm 200. In several embodiments, the seedbed surface sensor(s) 212 may include a rotary sensor 214 (e.g., a rotary potentiometer or a magnetic rotary sensor) coupled to one of the support arm 150 or the pivot arm 200 and an associated sensor linkage 216 coupled between the rotary sensor 214 and the other adjacent component. For instance, as shown in the illustrated embodiment, the rotary sensor 214 is coupled to a portion of the support arm 150, with the sensor linkage 216 being coupled between the rotary sensor 214 and the pivot arm 200. As such, when the pivot arm 200 pivots relative to the support arm 150, the motion of the pivot arm 200 may be detected by the rotary sensor 214 via the mechanical linkage provided by the sensor linkage 216.

In other embodiments, the seedbed surface sensor(s) 212 may correspond to any other suitable sensor(s) or sensing device(s) configured to detect the pivotal motion of the pivot arm 200. For instance, the seedbed surface sensor(s) 212 may correspond to a linear potentiometer, a proximity sensor, and/or any other suitable transducer (e.g., ultrasonic, electromagnetic, infrared, etc.) that allows the pivotal motion of the pivot arm 200 relative to the support arm 150 to be directly or indirectly detected.

As shown in FIGS. 4 and 6, the seedbed surface detection assembly 154 may also include one or more biasing mechanisms 218 configured to bias the surface-engaging member(s) 208 in the direction of the outer seedbed surface 158. For instance, as shown in the illustrated embodiment, the biasing mechanism(s) 218 corresponds to a spring-loaded device coupled between the support arm 150 and the pivot arm 200. As such, the spring-loaded device may bias the pivot arm 200 away from the support arm 150, thereby forcing the surface-engaging member(s) 208 downwardly in the direction of the outer seedbed surface 158. However, in other embodiments, the biasing mechanism(s) 218 may correspond to any other suitable device(s), such as a fluid-driven cylinder or any other suitable linear actuator.

Referring particularly to FIG. 4, in several embodiments, the disclosed system 100 may also include a controller 220 communicatively coupled to the floor and surface sensors 190, 212 (e.g., via a wired or wireless communicative link(s) 222). As such, the controller 220 may detect variations in the profile(s) of the seedbed floor 156 and/or the outer seedbed surface 158 by monitoring the measurement signals provided by the sensors 190, 212. In such an embodiment, the controller 220 may compare the detected variation(s) in the profile(s) for the seedbed floor 156 and/or the outer seedbed surface 158 to a predetermined variance threshold associated with each seedbed condition. In the event that the detected profile variation(s) exceed the predetermined variance threshold(s), the controller 220 may be configured to execute a control action designed to address the detected profile variation(s). For instance, if the detected variation in the vertical profile of the seedbed floor 156 exceeds a predetermined floor variance threshold set for the seedbed floor 156, the controller 220 may be configured to execute a control action designed to address the variations in the seedbed floor profile. Similarly, if the detected variation in the vertical profile of the outer seedbed surface 158 exceeds a predetermined surface variance threshold set for the outer seedbed surface 158, the controller 220 may be configured to execute a control action designed to address the variations in the surface profile.

It should be appreciated that the controller 220 may be configured to execute any suitable type of control action in response to the detected variations in the profile of the floor 156 and/or the outer surface 158 of the seedbed 160. For instance, in one embodiment, the controller 220 may be configured to adjust one or more operational parameters associated with the tillage implement 102, such as by adjusting the ground speed of the tillage implement 102, adjusting a down pressure applied through the ground-engaging toots 128, 130 of the implement 102 and/or adjusting a penetration depth associated with ground-engaging tools 128, 130. In another embodiment, the controller 220 may be configured to transmit suitable control signals configured to allow a suitable operator notification to be generated, such as by causing a visual notification to be displayed on a display device located within a cab of the work vehicle towing the implement 102 or by causing an audible notification to be generated for the operator.

Figure 8:
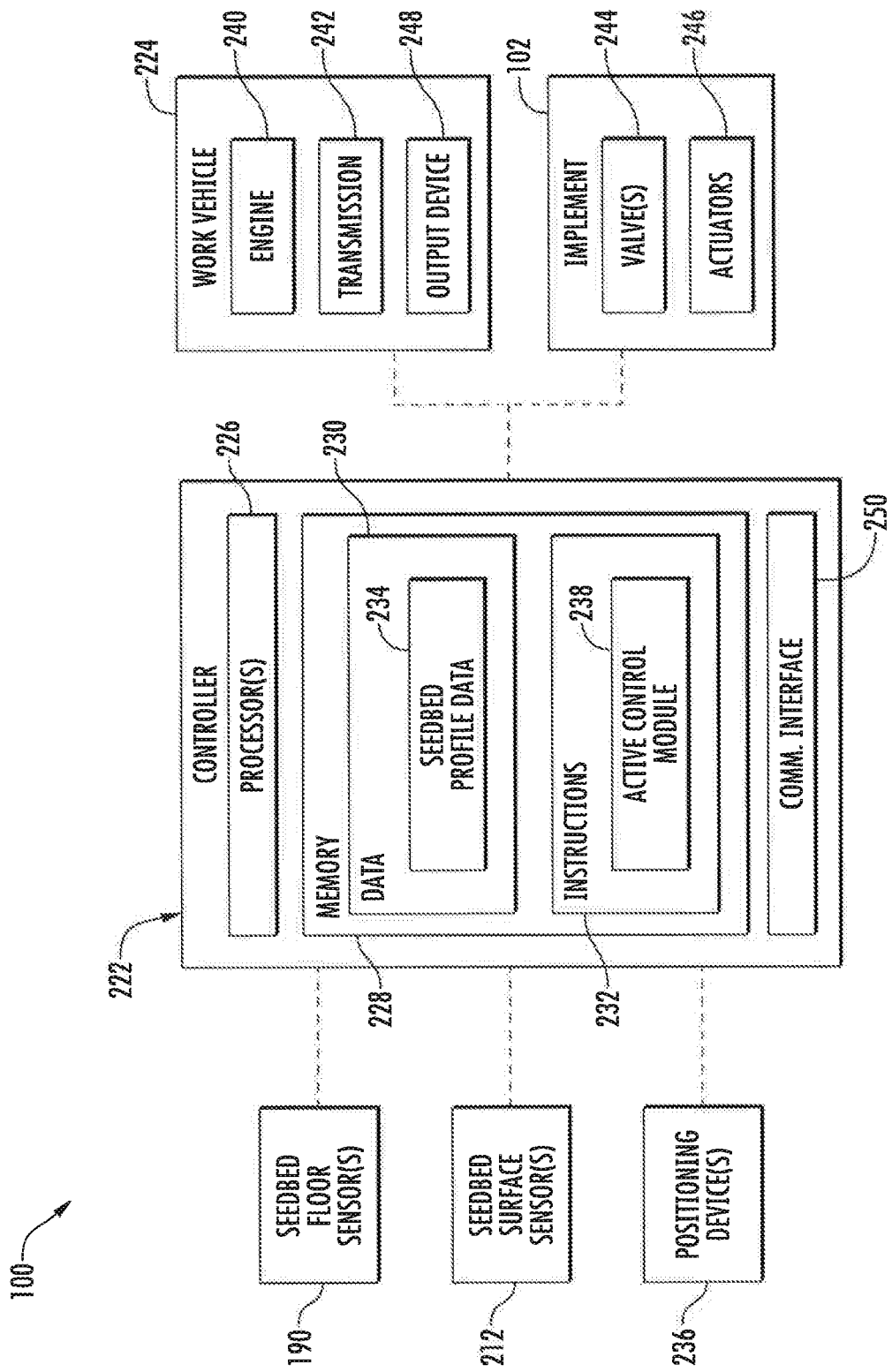
FIG. 8 illustrates a schematic view of one embodiment of a control diagram for the disclosed system in accordance with aspects of the present subject matter.

Referring now to FIG. 8, a schematic view of a control diagram for the system 100 described above is illustrated in accordance with aspects of the present subject matter. As shown, various system components may be communicatively coupled to and/or controlled by the controller 220, such as the seedbed floor sensor(s) 190, the seedbed surface sensor(s) 212, and/or various components of the implement 102 and/or the work vehicle (indicated by box 224 in FIG. 8) pulling the implement 102 across the field. As indicated above, based on the measurements signals provided by the sensors 190, 212, the controller 220 may be configured to detect variations in the profile(s) of the seedbed floor 156 and/or the outer seedbed surface 158. The controller 220 may then execute one or more control actions, if necessary or desired, when the detected profile variation(s) exceeds a given threshold(s).

In general, the controller 220 may correspond to any suitable processor-based device(s), such as a computing device or any combination of computing devices. Thus, as shown in FIG. 8, the controller 220 may generally include one or more processor(s) 226 and associated memory devices 228 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 228 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 228 may generally be configured to store information accessible to the processor(s) 226, including data 230 that can be retrieved, manipulated, created and/or stored by the processor(s) 226 and instructions 232 that can be executed by the processor(s) 226.

In several embodiments, the data 230 may be stored in one or more databases. For example, the memory 228 may include a profile database 234 for storing seedbed profile data received from the sensors 190, 212. In addition, when the controller 220 receives position data associated with the location of the tillage implement 102 within the field from a corresponding positioning device(s) 236 (e.g. a GPS system), the controller 220 may also be configured correlate the seedbed profile data with the corresponding position data and store such correlated data within the profile database 234. For instance, in one embodiment, the location coordinates derived from the positioning device(s) 236 and the seedbed profile data captured by the sensor(s) 190, 212 may both be time-stamped. In such an embodiment, the time-stamped data may allow specific seedbed profile data to be matched or correlated to a corresponding set of location coordinates received from the positioning device(s) 236, thereby allowing the precise location of the portion of the field associated with a given set of profile data to be known (or at least capable of calculation) by the controller 220. The correlated data may then be used, for example, to generate a seedbed profile map for the associated field.

Additionally, as shown in FIG. 8, in several embodiments, the instructions 232 stored within the memory 228 of the controller 220 may be executed by the processor(s) 226 to implement an active control module 238. In general, the active control module 238 may be configured to automatically execute one or more control actions when it is determined that the detected profile variation(s) in the floor 156 and/or the outer surface 158 of the seedbed 160 exceeds a given variance(s) threshold.

For instance, the controller 220 may be configured to adjust the operation of the tillage implement 102 in a manner designed to reduce the detected profile variation(s) in the seedbed floor 156 and/or outer surface 158. Specifically, in one embodiment, the controller 220 may be configured to increase or decrease the operational or ground speed of the implement 102. For instance, as shown in FIG. 8, the controller 220 may be communicatively coupled to both an engine 240 and a transmission 242 of the work vehicle 224 being used to pull the implement 102 across the field. In such an embodiment, the controller 220 may be configured to adjust the operation of the engine 240 and/or the transmission 242 in a manner that increases or decreases, as desired, the ground speed of the work vehicle 224 and, thus, the ground speed of the implement 102, such as by transmitting suitable control signals for controlling an engine or speed governor (not shown) associated with the engine 240 and/or transmitting suitable control signals for controlling the engagement/disengagement of one or more clutches (not shown) provided in operative association with the transmission 242.

In addition to the adjusting the ground speed of the implement 102 (or as an alternative thereto), the controller 220 may also be configured to adjust a ground-engaging parameter associated with the ground-engaging tools 128, 130 of the implement 102. For instance, as shown in FIG. 8, the controller 220 may be communicatively coupled to one or more valves 244 configured to regulate the supply of fluid (e.g., hydraulic fluid or air) to one or more corresponding actuators 246 (e.g., fluid-driven cylinders) of the implement 102. In such an embodiment, by regulating the supply of fluid to the actuator(s) 246, the controller 220 may automatically adjust the penetration depth, the down pressure, and/or any other suitable ground-engaging parameter(s) associated with the ground-engaging tools 128, 130 of the implement 102.

Moreover, as indicated above, in addition to adjusting one or more operating parameters associated with the tillage implement 102, the controller 220 may also be configured to transmit a notification to the operator of the work vehicle 224. For instance, as shown in FIG. 8, the controller 220 may be communicatively coupled to an output device 248 located within the cab of the work vehicle 224, such as a display device and/or a speaker, for a generating a notification that can be viewed and/or heard by the operator.

Referring still to FIG. 8, the controller 220 may also include a communications interface 250 to provide a means for the controller 220 to communicate with any of the various other system components described herein. For instance, one or more communicative links or interfaces may be provided between the communications interface 250 and the sensors 190, 212 to allow the profile data transmitted from the sensor(s) 190, 212 to be received by the controller 220. Similarly, one or more communicative links or interfaces may be provided between the communications interface 250 and the positioning device(s) 236 to allow the location information generated by the positioning device(s) 236 to be received by the controller 220. Moreover, as shown in FIG. 8, one or more communicative links or interfaces may be provided between the communications interface 250 and the engine 240, the transmission 242, the control valves 244, the output device 248, and/or the like to allow the controller 220 to control the operation of such system components.

Figure 9:
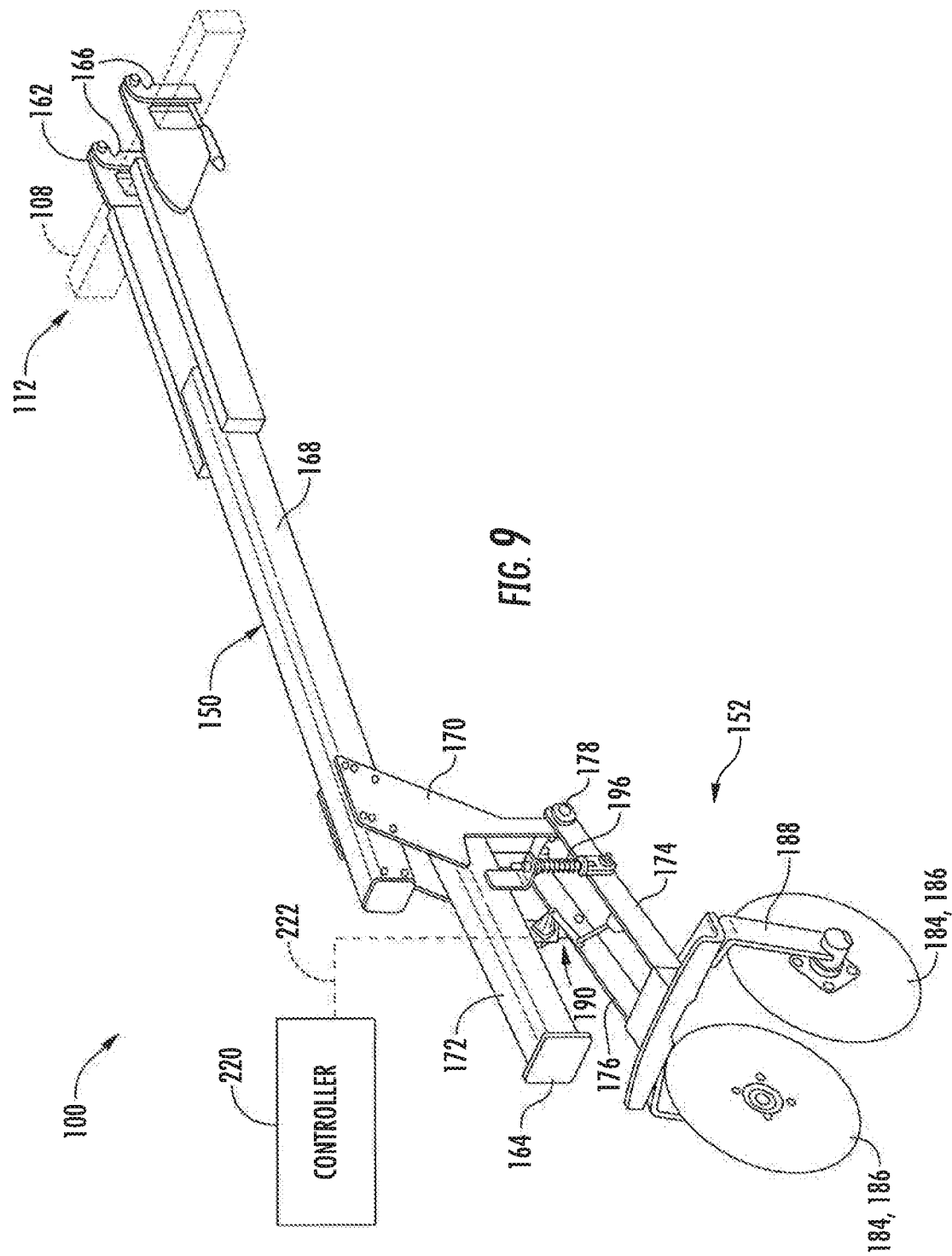
FIG. 9 illustrates a perspective view of another embodiment of system components suitable for use within a system for monitoring the condition of a seedbed when performing a field operation in accordance with aspects of the present subject matter, particularly illustrating the system including an auxiliary support arm and a seedbed floor detection assembly coupled to the support arm.
Figure 10:
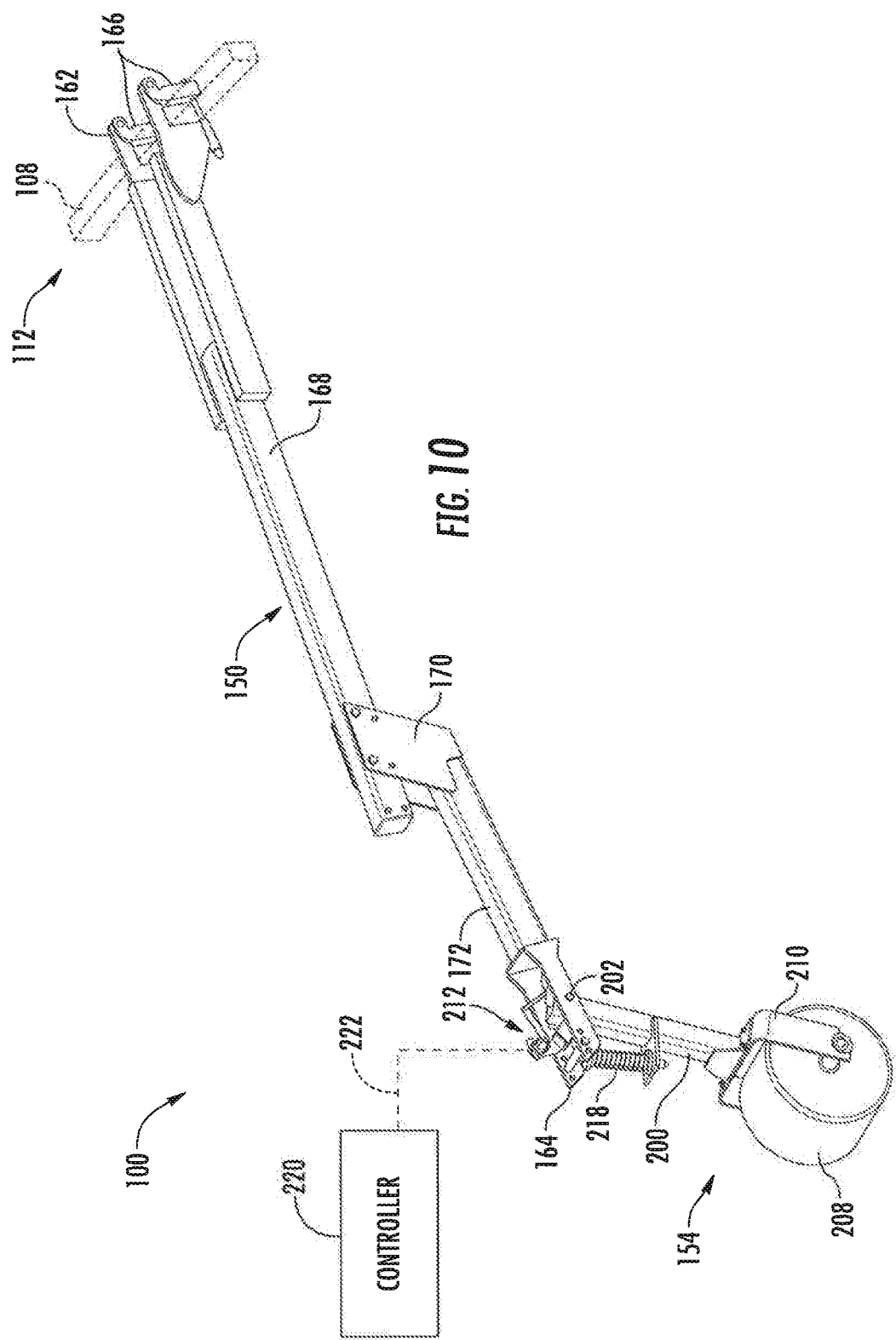
FIG. 10 illustrates a perspective view of a further embodiment of system components suitable for use within a system for monitoring the condition of a seedbed when performing a field operation in accordance with aspects of the present subject matter, particularly illustrating the system including an auxiliary support arm and a seedbed surface detection assembly coupled to the support arm.

It should be appreciated that, although the disclosed system 100 has generally been described herein as including both a seedbed floor detection assembly 152 and a seedbed surface detection assembly 154, such assemblies 152, 154 may also be used in isolation to monitor the associated condition of the seedbed 160 being created by the tillage implement 102. For example, FIG. 9 illustrates a perspective view of one embodiment in which the system 100 only includes a seedbed floor detection assembly 152 coupled to the auxiliary support arm 150. In such an embodiment, the seedbed floor detection assembly 152 may generally be configured the same as or similar to the floor detection assembly 152 described above with reference to FIGS. 1-8. Similarly, FIG. 10 illustrates a perspective view of another embodiment in which the system 100 only includes a seedbed surface detection assembly 154 coupled to the auxiliary support arm 150. In such an embodiment, the seedbed surface detection assembly 154 may generally be configured the same as or similar to the surface detection assembly 154 described above with reference to FIGS. 1-8. However, as shown in FIG. 10, as an alternative the rolling basket described above, the surface-engaging member 208 corresponds to a wheel or tire coupled to the pivot arm 200 of the surface detection assembly 154.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the condition of a seedbed within a field, the system comprising:
   an implement including a frame extending between a forward end and an aft end, the implement further including a plurality of ground-engaging tools supported by the frame, the implement being configured to create or be traversed across a seedbed extending downwardly within the field from an outer seedbed surface to a seedbed floor;
   an auxiliary support arm extending lengthwise between a proximal end and a distal end, the proximal end being rigidly coupled to a portion of the frame at or adjacent to the aft end of the frame such that the auxiliary support arm is non-pivotally coupled to the frame; and
   a seedbed surface detection assembly coupled to the auxiliary support arm such that the seedbed surface detection assembly is located behind the plurality of ground-engaging tools relative to a forward travel direction of the implement, the seedbed surface detection assembly comprising:
      a first pivot arm pivotally coupled to the auxiliary support arm;
      a rotary surface-engaging member rotatably coupled to the first pivot arm, the rotary surface-engaging member configured to roll along the outer seedbed surface as the implement is moved across the field in the forward travel direction;
      a sensor configured to detect pivotal motion of the first pivot arm relative to the support arm,
   wherein the pivotal motion of the first pivot arm is indicative of variations in a profile of the outer seedbed surface as the rotary surface-engaging member rolls along the outer seedbed surface with movement of the implement in the forward travel direction, and
   a seedbed floor detection assembly coupled to the auxiliary support arm such that the surface detection assembly is located behind the seedbed floor detection assembly relative to the forward travel direction of the implement the seedbed floor detection assembly comprising:
      a second pivot arm pivotally coupled to the auxiliary support arm at a location spaced apart from the first pivot arm;
      a seedbed tool coupled to the second pivot arm, the seedbed tool being configured to penetrate through loosened soil of the seedbed and ride along the seedbed floor as the implement is moved across the field in the forward travel direction; and
      a seedbed floor sensor configured to detect pivotal motion of the second pivot arm relative to the support arm,
   wherein the pivotal motion of the second pivot arm is indicative of variations in a profile of the seedbed floor as the seedbed tool rides along the seedbed floor with movement of the implement in the forward travel direction.

2. The system of claim 1, wherein the rotary surface-engaging member comprises a rolling basket coupled to the first pivot arm.

3. The system of claim 1, wherein the rotary surface-engaging member comprises a wheel coupled to the first pivot arm.

4. The system of claim 1, wherein the seedbed surface sensor comprises a rotary sensor coupled to one of the first pivot arm or the auxiliary support arm and a sensor linkage coupled between the rotary sensor and the other of the first pivot arm or the auxiliary support arm.

5. The system of claim 1, further comprising a biasing mechanism coupled between the auxiliary support arm and the first pivot arm, the biasing mechanism configured to bias the first pivot arm away from the auxiliary support frame towards the seedbed.

6. The system of claim 1, further comprising a controller communicatively coupled to the seedbed surface sensor, the controller being configured to monitor the variations in the profile of the outer seedbed surface.

7. The system of claim 6, wherein the controller is configured to compare the variations in the profile of the outer seedbed surface to a predetermined threshold.

8. The system of claim 7, wherein, when the variations in the profile of the outer seedbed surface exceed the predetermined threshold, the controller is configured to automatically execute a control action to address the variations in the profile of the outer seedbed surface.

9. The system of claim 8, wherein the control action is associated with adjusting at least one of a ground speed of the implement, a down pressure applied through the ground-engaging tools, or a penetration depth of the ground-engaging tools.

10. The system of claim 8, wherein the control action is associated with transmitting a notification to an operator of a work vehicle pulling the implement across the field.

11. The system of claim 1, wherein the seedbed tool comprises at least one rotary member configured to roll along the seedbed floor as the implement is moved across the field in the forward travel direction.

12. The system of claim 1, wherein the seedbed floor sensor comprises a rotary sensor coupled to one of the second pivot arm or the auxiliary support arm and a sensor linkage coupled between the rotary sensor and the other of the second pivot arm or the auxiliary support arm.

\* \* \* \* \*